US010515550B1

(12) United States Patent
Montemurro et al.

(10) Patent No.: US 10,515,550 B1
(45) Date of Patent: Dec. 24, 2019

(54) TRANSFERRING CONTROL OF VEHICLES

(71) Applicant: BlackBerry Limited, Waterloo, Ontario (CA)

(72) Inventors: Michael Peter Montemurro, Toronto (CA); James Randolph Winter Lepp, Ottawa (CA); Jeffrey Scott Dever, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/994,576

(22) Filed: May 31, 2018

(51) Int. Cl.
   *G08G 1/14* (2006.01)
   *B62D 15/02* (2006.01)
   *B60W 30/06* (2006.01)
   *G08G 1/01* (2006.01)

(52) U.S. Cl.
   CPC ............ *G08G 1/143* (2013.01); *B60W 30/06* (2013.01); *B62D 15/0285* (2013.01); *G08G 1/0112* (2013.01)

(58) Field of Classification Search
   CPC ..... G08G 1/143; G08G 1/0112; B60W 30/06; B62D 15/0285
   See application file for complete search history.

(56) References Cited

U.S. PATENT DOCUMENTS

| | | |
|---|---|---|
| 2013/0099892 A1 | 4/2013 | Tucker |
| 2014/0303837 A1* | 10/2014 | Tuukkanen ............ G06Q 10/02 701/36 |
| 2018/0284759 A1* | 10/2018 | Michalakis .......... G05D 1/0011 |

FOREIGN PATENT DOCUMENTS

| | | |
|---|---|---|
| EP | 3293995 A1 | 3/2018 |
| WO | 2014/166759 A1 | 10/2014 |

OTHER PUBLICATIONS

Ford, https://www.fordpass.com/en_us/home.html, Welcome to FordPass, Making your journey easier propels us further downloaded Apr. 13, 2018 (5 pages).
Telecom, https://www.telecomtvtracker.com/insights/media-information-park-and-joy-sensors-now-report-free-parking-spaces-in-hamburg-13040/,TelecomTV Tracker—Instant Intelligence & Analysis downloaded Apr. 13, 2018 (3 pages).
https://here.navigation.com/north-america/—GPS navigation map updates for vehicles and portable devices downloaded Apr. 13, 2018 (4 pages).
Nissan USA, Carwings Remote Control App : Now Nissanconnect? EV,a Mobile App That Keeps You Rooted to Your Leaf, Jul. 13, 2017 (5 pages).
European Patent Office, Extended European Search Report for Appl. No. 19176822.5 dated Oct. 8, 2019 (9 pages).

* cited by examiner

*Primary Examiner* — Curtis B Odom
(74) *Attorney, Agent, or Firm* — Trop, Pruner & Hu, P.C.

(57) ABSTRACT

In some examples, an electronic device includes a communication interface and at least one processor configured to exchange information with another device via the communication interface to allow transfer of control of operable aspects of a vehicle from a source entity to a target entity. In further examples, a method includes exchanging, by an electronic device, information with another device over a communication medium to allow transfer of control of operable aspects of a vehicle from a source entity to a target entity.

24 Claims, 4 Drawing Sheets

TRANSFERRING CONTROL OF VEHICLES

BACKGROUND

A vehicle can refer to any type of transport platform to carry cargo and/or people between different physical locations. Traditionally, vehicles are driven by human drivers. More recently, autonomous vehicles have been developed to be driven without human drivers.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Developments in the field of autonomous vehicles, intelligent transportation systems, and Internet-of-Things (IoT) sensors have made possible the potential automatic and remote control of vehicles.

An intelligent transportation system (ITS) refers to a system that relates to transport and traffic management associated with vehicles. An ITS can include roadside units to communicate with vehicles, e.g., the roadside units can receive information (e.g., measurement data from sensors, location data, speed data, etc.) from the vehicles, and/or the roadside units can send information (e.g., alerts, warnings, navigational data, etc.) to the vehicles. In addition, an ITS can include surveillance equipment, in the form of cameras and/or other sensors, to monitor traffic patterns, detect accidents, and so forth.

IoT refers to an interconnection of various devices over a network, such as the Internet. EoT (Enterprise of Things) refers to an interconnection of various devices over an enterprise network. An enterprise can comprise a company, business, educational system, financial institution, medical system, governmental organization, or other organization. The devices that are part of the IoT can be referred to as IoT devices and can comprise a variety of endpoints and other devices. Examples of IoT and EoT devices include without limitation vehicles, buildings, sensors, cameras, actuators, thermostats, and so forth.

In an example use case, automatic and remote control of a vehicle can allow for automatic and/or remote-controlled parking (and return) of a vehicle, such as in the context of virtual valet parking. Examples of vehicles include motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

With virtual valet parking (which does not use human valet parkers), a driver of the vehicle can drop off the vehicle at a specific location (such as a location that the driver wishes to visit), and a remote parking system can take over control of the vehicle to drive the vehicle to a parking space for parking. Virtual valet parking can benefit a user by avoiding time spent searching for a parking space, avoiding a long walk from a parking lot to a destination, and/or avoiding use of expensive traditional valet parking or expensive parking lots closer to a destination (e.g., an airport, a restaurant, a sports arena, a concert venue, etc.). Parking service operators benefit from more efficient parking space utilization due to tighter vehicle densities because extra space does not have to be provided between vehicles to open doors, and an automated system can park vehicles closer to each other. Additionally, vehicles can be parked in a manner where some vehicles may block other vehicles (such as when a first vehicle is parked in front or behind another vehicle). When a blocked vehicle is to be retrieved, the blocking vehicle(s) can be automatically moved away. In addition, traffic jams in a parking lot can be avoided or reduced since there would be a smaller number of vehicles driving around in search of available parking spaces. In addition, parking service operators do not have to provide for buses to carry drivers from parking lots to destinations.

With virtual valet parking, transfer of control of a vehicle is provided from the owner or operator of the vehicle (a "source" entity) to a parking service operator (a "target" entity).

Although reference is made to a virtual valet parking as an example use case, the transfer of control of a vehicle between a source entity and a target entity (or multiple target entities) can occur with other use cases.

Various issues can be associated with transfer of control between different entities. A first issue relates to trust between the entities. A target entity to which vehicle control is transferred has to trust that the source entity transferring the control actually has authority to perform the transfer. Moreover, a source entity has to be authorized to transfer operable aspects of a vehicle to a target entity.

An "operable aspect" of a vehicle can refer to a feature (or collection of features) of the vehicle that can be operated by an entity (either the source entity or the target entity).

A second issue relates to what operable aspects of a vehicle are transferred, and the time duration during which the transfer is valid. In some cases, it may not be desirable to allow the target entity to which vehicle control is transferred to have full access to all of the operable aspects of the vehicle. For example, a source entity may wish to set any or some combination of the following restrictions: allowed or prohibited geographic regions (a geofence that restricts movement of the vehicle geographically) where the vehicle can be driven by the target entity; restrictions on the maximum speed, acceleration, engine revolutions, braking rate, and so forth, at which the vehicle can be driven by the target entity; restricted or prohibited access to certain parts of the vehicle (such as the glove compartment, an interior of the vehicle, a trunk of the vehicle, an engine, a cargo space, an audio or video entertainment, a fuel tank, a power charging port, a navigation system, communication equipment such as cellular communications equipment, etc.); restricted or prohibited access to stored information of the vehicle (e.g., the vehicle's diagnostic information, measurement data of sensors, address book, past destination maps); restricted or prohibited access to modify settings and configurations of the vehicle; and so forth.

In accordance with some implementations of the present disclosure, a virtual transfer of control of a vehicle between different entities can be achieved using techniques and mechanisms that authenticate identities of the entities, and that authorize the transfer of selected operational aspects of the vehicle between the entities. The virtual transfer of control according to some implementations is flexible since not all operable aspects of the vehicle have to be transferred from a source entity to a target entity. Rather, the source entity can choose what operable aspects of the vehicle are to be transferred to the target entity.

In some examples, the source entity can be the owner or operator of the vehicle, where the owner or operator can be a human or an enterprise. The owner or operator can lease vehicles, rent vehicles, manage vehicle sharing, manage ride sharing, manage food delivery using vehicles, manage a transportation network, manage vehicles for hire, manage public transit vehicles, manage vehicles that deliver packages, and so forth. For example, a human can transfer control of vehicles to friends, relatives, co-workers, a human valet parker, or other drivers. An enterprise can transfer control of vehicles to customers, employees, and so forth.

Examples of other source entities that can transfer control of a vehicle to different entities include any or some combination of the following: a government authority (e.g., a department of motor vehicles or other similar agency to issue registrations for vehicles), a licensing authority (e.g., a department of public safety or other similar agency for issuing driver's licenses), a law enforcement authority (e.g., a police department), an insurance company, the manufacturer of the vehicle, and so forth. For example, a government authority or licensing authority can ensure that a driver has the appropriate registration and/or driver's license before the driver is allowed to operate a vehicle. A government or licensing authority can also ensure that a driver has purchased an insurance policy for the vehicle before the driver is allowed to drive the vehicle. Similarly, an insurance company can ensure that a driver of the vehicle has the appropriate insurance coverage and/or a valid driver's license before control of the vehicle can be transferred to the driver.

As other examples, a finance company can be an example of a source entity that can transfer control of the vehicle to a driver. For example, the finance company may have made a loan on the vehicle, and so long as the driver is up to date on payments to the finance company, the finance company can continue to allow control of the vehicle by the driver. However, if the driver is delinquent on payment of the loan, the finance company can prevent driving of the vehicle by the driver (i.e., by withdrawing control of the vehicle by transferring control from the driver back to the finance company), or, in some cases, can gain control of the vehicle to perform a virtual repossession by automatically and remotely driving the vehicle back to a facility associated with the finance company.

In further examples, a law enforcement agency can also transfer control of the vehicle from a driver to a law enforcement system or law enforcement agent (e.g., police officer). For example, a vehicle may be illegally parked, or the driver may have been caught driving while intoxicated. In such cases, transfer of control of the vehicle from the driver to the law enforcement system or agent can allow the law enforcement system or agent to drive the vehicle away (virtual impound or tow).

Figure 1:
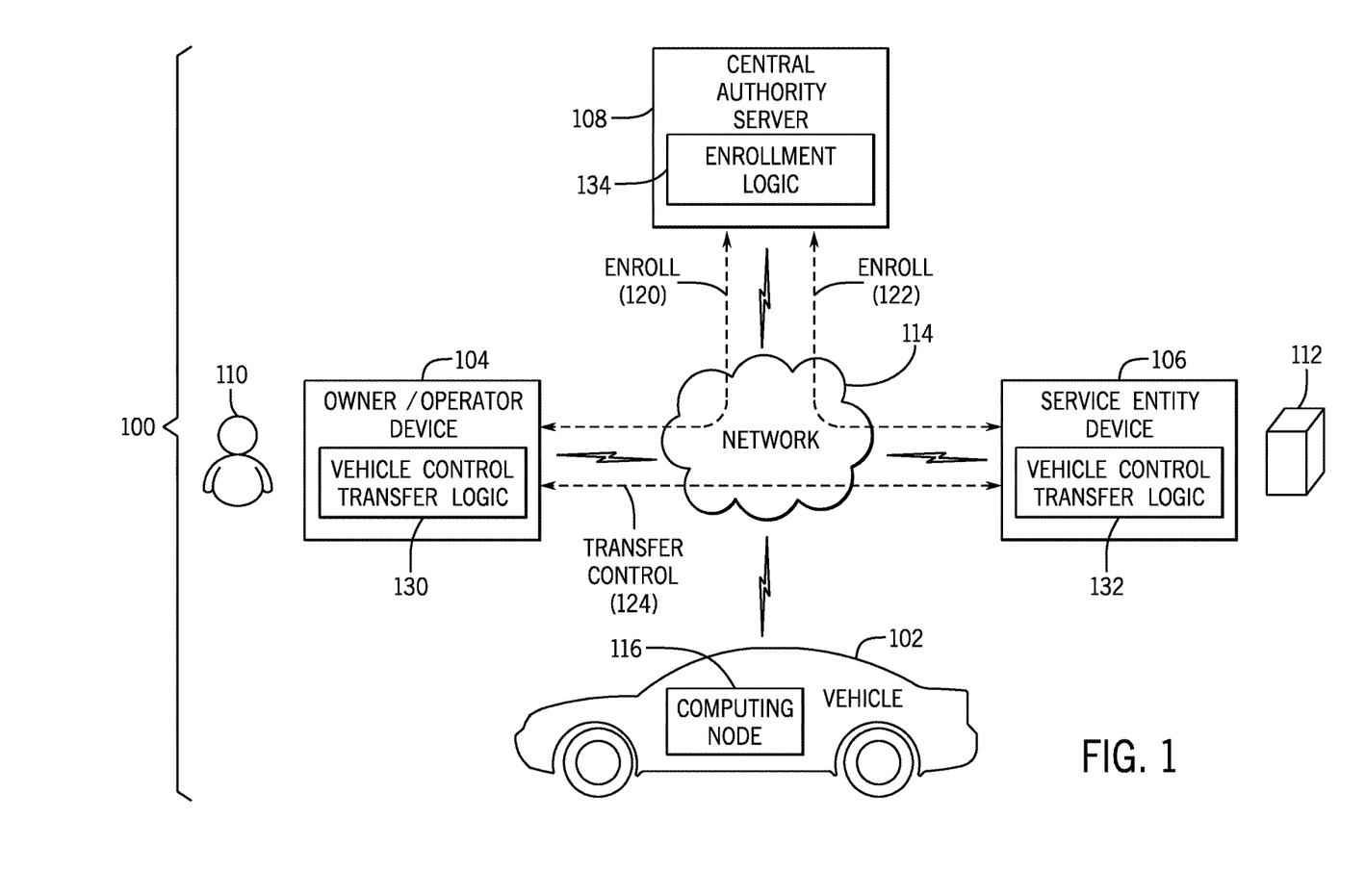
FIG. 1 is a block diagram of an example arrangement that includes a vehicle, a central authority server, an owner/operator device, and a service entity device, according to some examples.

FIG. 1 is a block diagram of an example arrangement 100 that includes a vehicle 102, an owner/operator device 104, a service entity device 106, and a central authority server 108. The owner/operator device 104 is associated with an owner/operator 110, and the service entity device 106 is associated with a service entity 112. The owner/operator 110 is the driver of the vehicle 102. The service entity 112 provides a service with respect to the vehicle 102. For example, the service entity 112 can be a parking service operator that can park the vehicle 102 on behalf of the owner/operator 110.

Although one vehicle 102, one owner/operator device 104, one service entity device 106, and one central authority server 108 are shown in FIG. 1, it is noted that in other examples, there can be more than one vehicle 102, more than one owner/operator device 104, more than one service entity device 106, and/or more than one central authority server 108.

Each of the device 104 or 106 can be implemented using any of the following: a desktop computer, a notebook computer, a tablet computer, a smartphone, a wearable device (e.g., a smart watch, smart eyeglasses, a head-mounted device, etc.), or any other type of electronic device. The central authority server 108 can be implemented using a computer or a number of computers, and can be a web server, a cloud server, or any other server accessible over a network 114.

The vehicle 102, owner/operator device 104, service entity device 106, and central authority server 108 are able to communicate over the network 114. The network 114 can include a wireless network and/or a wired network. Thus, each of the vehicle 102, owner/operator device 104, service entity device 106, and central authority server 108 can communicate either wirelessly or over a wired link with the network 114. They may communicate over more than one network, the same network or different networks and networking technologies.

Although examples refer to an owner/operator device 104 and the service entity device 106, it is noted that in other examples, the device 104 can be associated with a different source entity that can transfer control of the vehicle 102, and the device 106 can also be associated with a different target entity to which control of the vehicle 102 can be transferred. More generally, the device 104 is associated with a source entity who wishes to transfer control of the vehicle 102 to a target entity associated with the device 106.

The vehicle 102 includes a computing node 116, which can be implemented using a computer, a processor, or any other processing resource that can control vehicle operation (or at least control access to operation) of the vehicle 102. The owner/operator device 104 and the service entity device 106 can communicate with the computing node 116 of the vehicle 102 over the network 114, such as to remotely control the vehicle 102.

The vehicle 102 can be driven by a human driver, or the vehicle 102 can be operated as a driverless vehicle (i.e., an autonomous vehicle), either by the owner/operator 110 or by the service entity 112, or the vehicle 102 can be operated in a semi-autonomous manner with human assistance.

To enable the owner/operator 110 of the vehicle 102 and the service entity 112 to establish trust, both the owner/operator 110 and the service entity 112 can enroll with the central authority server 108, using enrollment procedures 120 and 122, respectively, between the owner/operator device 104 or the service entity device 106 and the central authority server 108.

The owner/operator device 104 includes a vehicle control transfer logic 130, and the service entity device 106 includes a vehicle control transfer logic 132. As used here, "logic" can refer to a hardware processing circuit, which can include any or some combination of a microprocessor, a core of a multi-core microprocessor, a microcontroller, a programmable integrated circuit device, a programmable gate array, and so forth. Alternatively, "logic" can refer to a combination of a hardware processing circuit and machine-readable instructions executable on the hardware processing circuit.

The enrollment procedures 120 and 122 can be performed by the vehicle control transfer logic 130 and the vehicle control transfer logic 132, respectively, with an enrollment logic 134 in the central authority server 108. The enrollment procedures 120 and 122 are used to authenticate the identities of the owner/operator 110 and the service entity 112. The identities of the parties involved in the control transaction can be validated by the central authority server 108 that has a role of a root authority, for example. The root authority is used to establish trust in the identity of parties (the owner/operator 110 and the service entity 112 in the example of FIG. 1) in a control transaction. The root authority can be associated with the owner/operator 110, a government or other supervisory entity that registers or licenses the vehicle or driver, an insurance company, a finance company, a law enforcement agency, and so forth.

Alternatively, authentication of the identities of the owner/operator 110 and the service entity 112 can be performed without using the central authority server 108. In such alternative examples, a different authentication procedure can be used between the owner/operator device 104 and the service entity device 106, such as based on use of short range technologies such as Near Field Communication (NFC), Bluetooth Low Energy (BLE), Neighborhood Awareness Network (NAN), and so forth. Such a different authentication procedure can include peer-to-peer authentication in which the owner/operator device 104 and the service entity device 106 can authenticate each other, such as by using public and private keys of the devices, or other credentials (e.g., usernames and passwords, etc.).

Once the owner/operator 110 and the service entity 112 are enrolled (or otherwise authenticated), the owner/operator 110 and the service entity 112 can use the respective owner/operator device 104 and the service entity device 106 to establish a secure connection, and to transfer control (124) of selected operational aspects of the vehicle 102 from the owner/operator 110 to the service entity 112, in a trusted and secure manner.

In the ensuing discussion, it is assumed that the central authority server 108 is used for authenticating identities of a source entity and a target entity, such as the owner/operator 110 and service entity 112, respectively, of FIG. 1.

Figure 2:
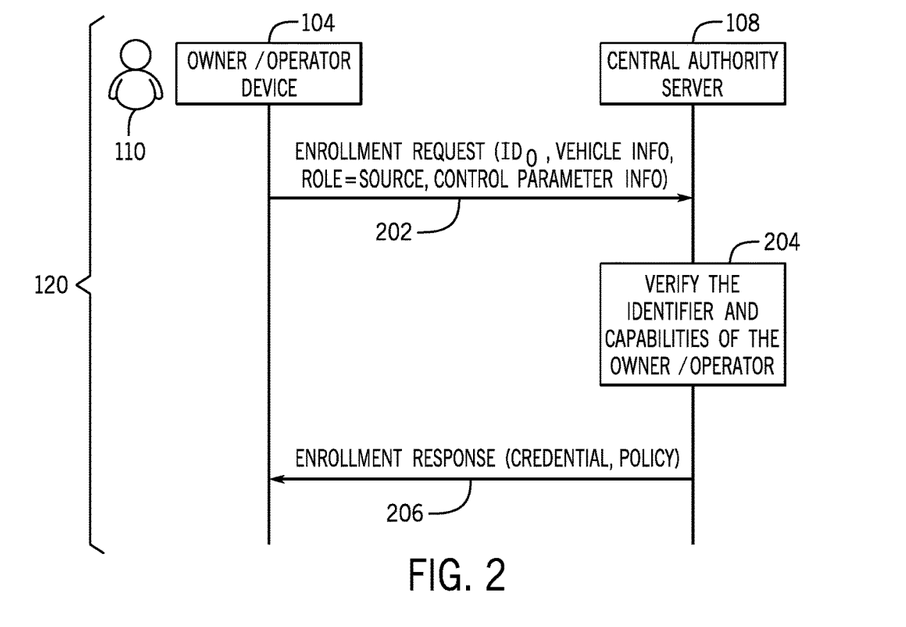
FIG. 2 is a flow diagram of a process of an owner/operator device enrolling with a central authority server, according to some examples.

FIG. 2 shows the enrollment procedure 120 performed by the owner/operator device 104 with the central authority server 108 to enroll the owner/operator 110. In examples where there are multiple central authority servers, the owner/operator 110 can select the appropriate one of the central authority servers to enroll with.

The owner/operator device 104 sends (at 202), to the central authority server 108, an enrollment request. The enrollment request includes or is otherwise associated with an identifier of the owner/operator 110, vehicle information, a role indicator (that is set to a value indicating that the owner/operator 110 that caused the enrollment request to be sent has a role of a source entity), and control parameter information.

An enrollment request can refer to a message or an information element (or a group of messages or group of information elements) that indicates that the owner/operator device 104 is requesting the initiation of an enrollment procedure.

The identifier of the owner/operator 110 can include a name of the owner/operator 110, an email or other online address or handle of the owner/operator 110, or any other type of identifier. In more specific examples, the identifier of the owner/driver 110 can be based on authentication credentials of the owner/driver 110, such as those on the Universal Integrated Circuit Card (UICC) or Subscriber Identity Module (SIM) of a smartphone or other device.

The vehicle information includes information that identifies the vehicle, such as the vehicle's registration number, such as a vehicle identification number (VIN), a hull identification number (HIN), an aircraft registration number, and so forth. The vehicle information can also include other information relating to the vehicle, such as information describing the make and model of the vehicle, features available on the vehicle, and so forth.

The control parameter information can include one or more control parameters. The control parameter(s) can indicate the operational aspect(s) (including any restriction) of the vehicle 102 that the owner/operator 110 wishes to transfer.

Examples of control parameters can include any or some combination of control parameters that specify: transfer of remote driving; transfer of control of a door lock; transfer of window control; transfer of an ability to transfer control of the vehicle (or a subset of operable aspects of the vehicle); a restriction or permission on geographic regions where the vehicle can be driven or operated by the target entity; a restriction or permission on the maximum operating condition of the vehicle, such as a maximum speed, acceleration, engine revolutions, braking rate, and so forth, at which the vehicle can be driven or operated by the target entity; a restriction or permission on access to certain parts of the vehicle (such as the glove compartment, an interior of the vehicle, a trunk of the vehicle, an engine, a cargo space, an audio or video entertainment, a fuel tank, a power charging port, a navigation system, communication equipment such as cellular communications equipment, wireless network systems, short-range communication systems, etc.); a restriction or permission on access to a control interface that enables access of stored information of the vehicle (e.g., the vehicle's diagnostic information, measurement data of sensors, etc.); a restriction or permission on access to a control interface to modify settings and configurations of the vehicle; and so forth.

The control parameter information sent by the owner/operator device 104 with the enrollment request specifies selected operational aspects of the total number of operational aspects of the vehicle 102 that the owner/operator 110 specifies can be transferred to a target entity.

The central authority server 108 may have a default control parameter information (including one or more control parameters) that can be used if the owner/operator device 104 does not provide control parameter information with the enrollment request (202).

In either case, different target entities can be transferred different operational aspects of the vehicle 102. For example, if the service entity 112 comprises a parking service operator, the owner/operator 110 can transfer driving privileges to the parking service operator, with specified restrictions (e.g., restrictions on geographic locations, access to certain parts of the vehicle 102, and maximum speed). For the parking service operator, a first set of control parameters can be specified. In some examples, the first set of control parameters can be included in a first profile that corresponds to the parking service operator.

As used here, a "set of control parameters" can include one or more control parameters.

As another example, if the service entity 112 comprises a vehicle repair shop, the owner/operator 110 can transfer to the vehicle repair shop an ability to access diagnostic information and to access the engine or other parts of the vehicle for repair. For the vehicle repair shop, a second set of control parameters can be specified. In some examples, the second set of control parameters can be included in a second profile that corresponds to the vehicle repair shop.

In further examples, the owner/operator 110 can transfer different operational aspects to multiple different target entities. For example, to perform repair of the vehicle 102, the owner/operator 110 can transfer (using one set of control parameters) first operational aspects to the vehicle repair shop to perform repairs, and transfer (using another set of control parameters) second operational aspects to another target entity to drive the vehicle back to the owner/operator 110 once the repair is completed. The foregoing can be specified by another profile.

The control parameter information sent with the enrollment request can include one or more profiles that include respective set(s) of control parameters.

More generally, when transferring control from the owner/operator 110 to a target entity, the selecting of the operable aspects of the vehicle to which control is passed from the owner/operator 110 to the target entity is based on a selected profile of multiple profiles that govern different types of control transfer of the vehicle.

The central authority server 108 verifies (at 204) the identifier of the owner/operator 110 and capabilities of the owner/operator 110. The verification of the identifier of the owner/operator 110 can be based on any of various authentication techniques, such as according to an Authentication and Key Agreement (AKA) protocol used in cellular networks, based on use of credentials (e.g., username and password, biometric information, etc.) of the owner/operator 110, and so forth.

The verification of the capabilities of the owner/operator 110 includes confirming that the owner/operator 110 in fact has the ability to transfer the operational aspects included in the control parameter information. As an example, an owner of the vehicle 102 has the ability to transfer all operational aspects of the vehicle 102. However, a different source entity (such as a friend or relative that has borrowed the vehicle 102) may only be allowed to transfer a subset of the operational aspects of the vehicle 102.

As yet another example, a valet parker of the vehicle 102 would have no right to transfer any control of the vehicle to another entity.

If the enrollment request attempts to enroll a transfer of operational aspects that are outside the capabilities of the source entity requesting the enrollment, then the enrollment request can be denied.

In response to verifying the identifier and the capabilities of the owner/operator 110, the central authority server 108 sends (at 206), to the owner/operator device 104, an enrollment response that includes or is otherwise associated with an owner/operator credential and a policy.

The owner/operator credential includes information that can be used by the owner/operator device 104 to authenticate with a target entity to which transfer of control of the vehicle 102 is to be performed. For example, the owner/operator credential can include any of the following information: a digital certificate, key information (e.g., a public key, a private key, a symmetric key, etc.), an electronic cryptographic element, or any other information useable by the owner/operator 110 to authenticate with a target entity (such as the service entity 112) to which transfer of control of the vehicle 102 is to occur.

The policy sent with the enrollment response includes one or more permission elements that can be granted by the owner/operator 110. The permission elements of the policy can include all or a subset of the control parameters sent by the owner/operator device 104 to the central authority server 108 with the enrollment request. Alternatively, the permission elements can include elements different from the control parameters sent by the owner/operator device 104. As yet another alternative, such as in examples where the owner/operator device 104 did not send control parameter information with the enrollment request, the policy elements can include all or a subset of the default control parameters maintained at the central authority server 108.

In some examples, the policy can further include a whitelist of target entities to which transfer of control of the vehicle 102 is permitted. Additionally or alternatively, the policy can include a blacklist of target entities to which transfer of control of the vehicle 102 is not permitted. The owner/operator device 104 can consult with the whitelist or blacklist or both before beginning a procedure to transfer control of the vehicle 102. If a whitelist is provided, the owner/operator device 104 will permit a request to transfer control of the vehicle 102 only to target entities on the whitelist. If a blacklist is provided, the owner/operator device 104 will block a request to transfer control of the vehicle 102 only to target entities on the blacklist.

Figure 3:
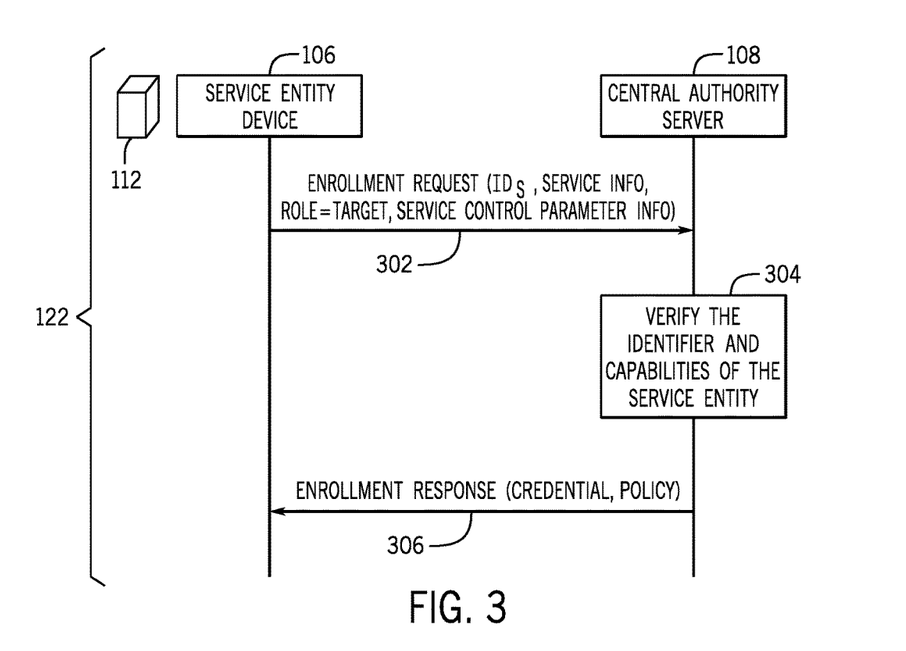
FIG. 3 is a flow diagram of a process of a service entity device enrolling with a central authority server, according to some examples.

A corresponding enrollment procedure 122 is performed by the service entity device 106 to enroll the service entity 112, as shown in FIG. 3. The service entity device 106 sends (at 302), to the central authority server 108, an enrollment request that includes or is otherwise associated with an identifier of the service entity 112, service information, a role indicator (that is set to a value indicating that the service entity 112 that caused the enrollment request to be sent has a role of a target entity), and service control parameter information.

The identifier of the service entity 112 can include a name of the service entity 112, an email or other online address or handle of the service entity 112, or any other type of identifier.

The service information includes information that identifies one or more service(s) provided by the service entity 112, such as a service identifier. The service information can also include other information describing the service(s).

The service control parameter information can include one or more service control parameters. The service control parameter(s) can indicate the operational aspect(s) of the vehicle 102 that the service entity 112 is able to control. For example, if the service entity 112 is a parking service operator, then the service control parameter(s) can indicate that the service entity 112 is able to drive the vehicle 102 within a restricted geographic region (between a destination and a parking lot, for example). The parking service operator would not be able to control other operational aspects of the vehicle 102, such as accessing diagnostic information of the vehicle 102.

The central authority server 108 may have a list of default service control parameters based on the type of the service entity 112 or based on the service information provided.

The central authority server 108 verifies (at 304) the identifier of the service entity 112 and the capabilities of the service entity 112. The verification of the identifier of the service entity 112 can use similar techniques as applied for the verification of the identifier of the owner/operator 110 discussed above.

The verification of the capabilities of the service entity 112 includes confirming that the service entity 112 in fact has the ability to accept transfer of the operational aspects included in the service control parameter information.

In response to verifying the identifier and the capabilities of the service entity 112, the central authority server 108 sends (at 306), to the service entity device 106, an enrollment response that includes or is otherwise associated with a service entity credential and a policy.

The service entity credential includes information that can be used by the service entity device 106 to authenticate with a source entity from which transfer of control of the vehicle 102 is to be passed. For example, the service entity credential can include any of the following information: a digital certificate, key information (e.g., a public key, a private key, a symmetric key, etc.), or any other information useable by the service entity 112 to authenticate with a source entity (such as the owner/operator 110) from which transfer of control of the vehicle 102 is to pass.

The policy sent with the enrollment response includes one or more permission elements that can be granted to the service entity 112. The permission elements of the policy can include all or a subset of the service control parameters sent by the service entity device 106 to the central authority server 108 with the enrollment request. Alternatively, the permission elements can include elements different from the service control parameters sent by the service entity device 106. As yet another alternative, such as in examples where the service entity device 106 did not send control parameter information with the enrollment request, the policy elements can include all or a subset of the default service control parameters maintained at the central authority server 108.

Figure 4:
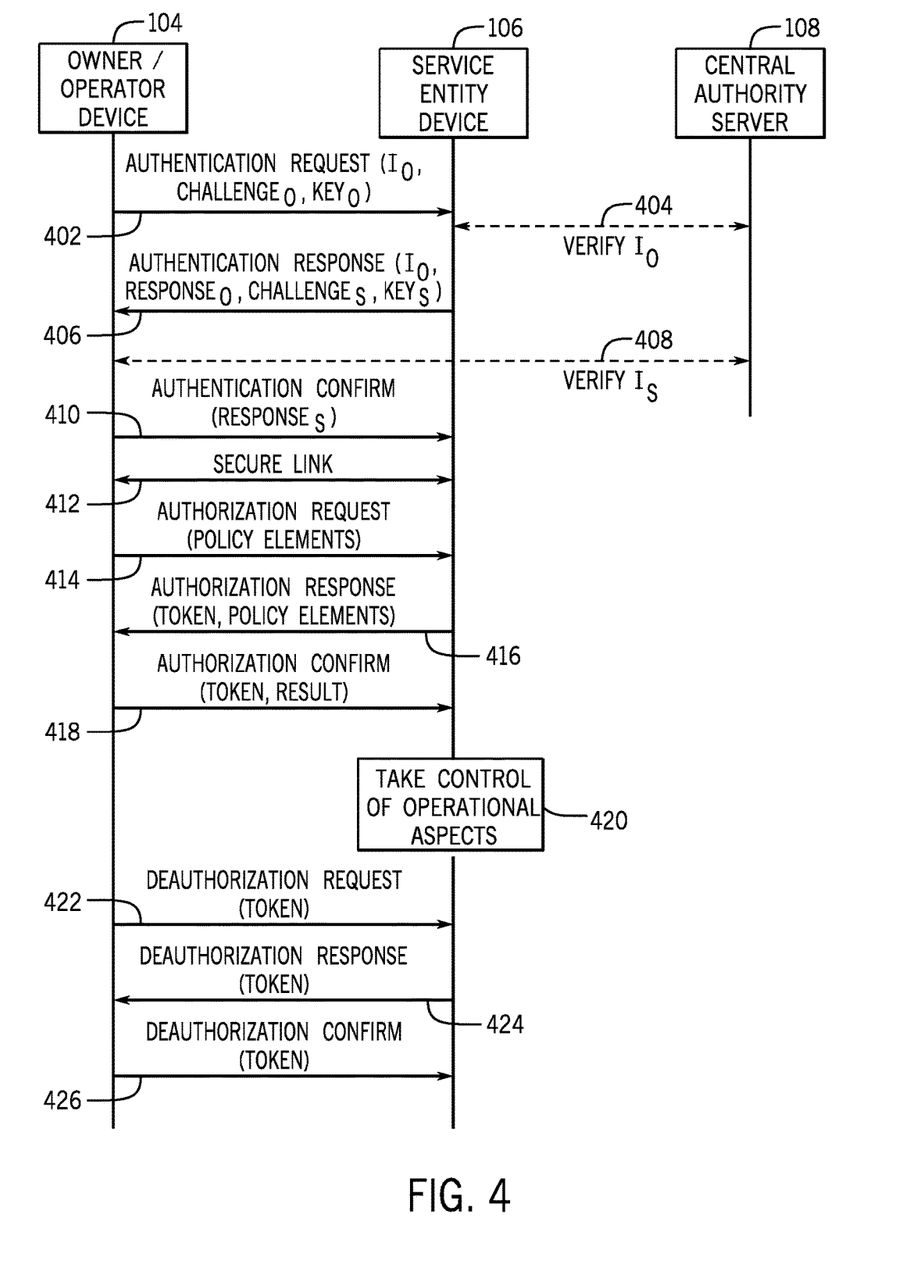
FIG. 4 is a flow diagram of a process of transferring control between an owner/operator and a service entity, according to some examples.

FIG. 4 is a flow diagram illustrating a process for transferring control of the vehicle 102 according to some examples. After the owner/operator 110 determines that the owner/operator 110 wishes to use a service of the service entity 112 that involves a transfer of control of the vehicle 102 from the owner/operator 110 to the service entity 112, the owner/operator 110 interacts with the owner/operator device 104 to begin the vehicle control transfer process.

Operations of the owner/operator device 104 can be performed by the vehicle control transfer logic 130 (FIG. 1), and operations of the service entity device 106 can be performed by the vehicle control transfer logic 132.

Authorization for the transfer of control of selected operational aspects between the owner/operator 110 and service entity 112 can be based on possession of the credentials provided in the enrollment response (206) and enrollment response 306 provided to the owner/operator device 104 and the service entity device 106, respectively, in FIGS. 2 and 3.

In the following examples, it is assumed that the credentials include keys that can be used in the authorization of transfer of control. In other examples, other types of credentials can be used.

The owner/operator device 104 sends (at 402) an authentication request to the service entity device 106. The authentication request includes an identifier ($I_o$) of the owner/operator 110, an owner/operator challenge (Challenge$_o$), and an owner/operator key (Key$_o$) (which can be part of the credential provided by the central authority server 108 to the owner/operator device 104 as part of the enrollment procedure 120 of FIG. 2).

The owner/operator challenge (Challenge$_o$) is included in the authentication request in examples where a challenge-response authentication procedure is employed between the owner/operator device 104 and the service entity device 106. For example, the owner/operator challenge can include an encrypted version of a randomly generated information at the owner/operator device 104. A valid response can be a similarly encrypted value that is some predetermined function of the originally offered information, thus proving that the receiver was able to decrypt the challenge. The owner/operator key (Key$_o$) is used as part of the challenge-response authentication procedure for the owner/operator challenge (Challenge$_o$).

In other examples, other authentication mechanisms can be employed.

In some examples, in response to receiving the authentication request, the service entity device 106 can optionally interact (at 404) with the central authority server 108 to verify the identifier ($I_o$) of the owner/operator 110.

Assuming that the identifier ($I_o$) of the owner/operator 110 has been verified, the service entity device 106 responds (at 406), to the owner/operator device 104, with an authentication response, which includes an identifier ($I_S$) of the service entity 112, a challenge response (Response$_o$) to the owner/operator challenge (Challenge$_o$), a service entity challenge (Challenge$_S$) that is issued to the owner/operator device 104, and a service entity key (Key$_S$) (which can be the credential provided by the central authority server 108 to the service entity device 106 as part of the enrollment procedure 122 of FIG. 3). The service entity key (Key$_S$) can be used in the challenge-response authentication procedure for the service entity challenge (Challenge$_S$).

In some examples, assuming that the challenge response (Response$_o$) is a valid response to the owner/operator challenge (Challenge$_o$), the owner/operator device 104 optionally interacts (at 408) with the central authority server 108 to verify the identifier ($I_S$) of the service entity 112.

Assuming that the challenge response (Response$_o$) is a valid response to the owner/operator challenge (Challenge$_o$), and the identifier ($I_S$) of the service entity 112 has been verified, the owner/operator device 104 sends (at 410), to the service entity device 106, an authentication response including a challenge response (Response$_S$) to the service entity challenge (Challenge$_S$). If the challenge response (Response$_S$) is a valid response to the service entity challenge (Challenge$_S$), then the owner/operator device 104 and the service entity device 106 are able to establish a secure link 412 in which data can be exchanged between the devices 104 and 106 in a secure manner. For example, data over the secure link 412 can be encrypted using a public key and decrypted using a corresponding private key. Other forms of a secure link can be established between the owner/operator device 104 and the service entity device 106 in other examples.

In specific examples, the secure link 412 can include a Transport Layer Security (TLS) connection. The owner/operator 110 and the service entity 112 can be assigned a public key/private key pair signed by a trusted third party (e.g., the central authority server 108). The owner/operator 110 and the service entity 112 can exchange public keys and establish secure connectivity using TLS.

In another example, a secure link based on an Elliptic-curve Diffie-Hellman (ECDH) protocol can be used. The owner/operator 110 and the service entity 112 can be assigned elliptic curve public key/private key pairs by a trusted party (e.g., the central authority server 108). Each of owner/operator device 104 and service entity device 106 can use the ECDH protocol to derive a symmetric encryption key for secure communications over the secure link 412.

In another example, the owner/operator 110 and the service entity 112 are assigned a UICC or SIM or other hardware module from a network operator licensed by a government registration authority. The owner/operator 110 and the service entity 112 establish a secure link using a protocol that interacts with the network operator.

After the authentication has been successfully completed and the secure link 412 established, the owner/operator device 104 sends (at 414), to the service entity device 106, an authorization request to initiate a transfer of control of the vehicle 102 to the service entity 112. The authorization request includes policy elements. The policy elements include at least a subset of the policy elements returned by the central authority server 108 to the owner/operator device 104 in the enrollment response 206 of FIG. 2, for example. The policy elements indicate the operational aspects of the vehicle 102 that are the subject of transfer associated with the authorization request.

In further examples, a policy element included in the authorization request can specify a time duration of the transfer of control of the vehicle 102. For example, the start time and expiration time during which transfer of control of the vehicle 102 is effective can be specified in the policy element.

In response to the authorization request, the service entity device 106 sends (at 416) an authorization response that includes a token and policy elements.

The policy elements included in the authorization response can indicate the operational aspects that the service entity 112 is willing to accept control of. The policy elements included in the authorization response can include all or a subset of the policy elements in the authorization request.

The token can be any information useable by the owner/operator device 104 and the service entity device 106 to identify a session associated with the transfer of control of the vehicle between the owner/operator 110 and the service entity 112. In some examples, the token can further include the policy elements.

In response to the authorization response, the owner/operator device 104 sends (at 418) an authorization confirm to the service entity device 106. The authorization confirm can include the token and a result. The result can indicate success (if the authorization of the transfer of control of the vehicle 102 succeeded) or failure (if the authorization of the transfer of control of the vehicle 102 failed). The authorization may fail if, for example, the policy elements returned in the authorization response from the service entity device 106 are not adequate or are incomplete.

Assuming that the result indicates success, then the transfer of the operational aspects of the vehicle 102 indicated by the policy elements has completed, and the service entity 112 is able to take control (at 420) of those operational aspects of the vehicle 102.

At a later time, the owner/operator 110 can decide to deauthorize the control of the vehicle 102 from the service entity 112. To do so, the owner/operator device 104 sends (at 422) a deauthorization request (at 422) to the service entity device 106. The authorization request includes the token. In response to the deauthorization request, the service entity device 106 sends (at 424) a deauthorization response to the owner/operator device 104. The deauthorization response includes the token. The owner/operator device 104 then sends (at 426) a deauthorization confirm to the service entity device 106, which also contains the token. At this point, control of the vehicle 102 has been transferred back to the owner/operator 110.

The following describes an example use case in which the service entity 112 comprises a parking service operator. When the vehicle 102 operated by the owner/operator 110 enters a region in proximity to a drop off point, wireless communication can be established between the owner/operator device 104 and the service entity device 106 (e.g., NFC communication, Bluetooth communication, Wi-Fi communication, cellular communication, etc.). The process of FIG. 4 can then be performed, in which the owner/operator's identifier stored in the owner/operator device 104 can be sent to the service entity device 106, or alternatively, the owner/operator 110 can activate a control element (e.g., pushing a button, entering a password or performing a key card scan, providing a biometric input (e.g., fingerprint scan, etc.) to provide the owner/operator's identifier. The service entity 112 can use a similar mechanism to provide an identifier of the service entity 112.

Once the authorization of the transfer of operation aspects of the vehicle to the parking service operator has been successfully performed according to FIG. 4, the parking service operator can drive the vehicle 102 away to a parking space. Later, when the owner/operator 110 returns to a pick up point for the vehicle 102, the parking service operator returns the vehicle 102 to the owner/operator 110, at which point the deauthorization process (tasks 422, 424, 426 of FIG. 4) can be performed to transfer control of the vehicle 102 back to the owner/operator 110.

In some examples, an audit log (or transaction register) can be maintained by the vehicle 102 or central authority server 108, or by both. The audit log tracks the history of which entity or device is in control of the vehicle 102. In some cases, multiple entities such as 110 and 112 can concurrently have control over some operational aspects of the vehicle 102. In other cases, one entity is responsible for the operation of the vehicle. An entity can include a human driver or operator, a computerized autonomous driver or operator local to or remote from the vehicle. The audit log can track for insurance purposes or billing purposes or law enforcement purposes what entity was in control of the vehicle at what time. In the case of a vehicle malfunction or crash, the responsible controlling entity can be determined. The audit log can be stored in the form of a blockchain to track transactions in a distributed manner.

Figure 5:
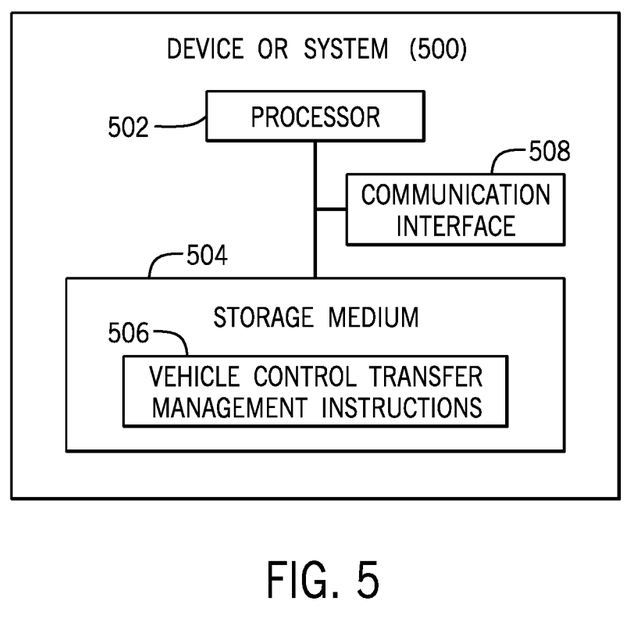
FIG. 5 is a block diagram of an electronic device or system according to further examples.

FIG. 5 is a block diagram of a device or system 500. The device or system 500 can comprise any of the owner/operator device 104, the service entity device 106, or the central authority server 108.

The device or system 500 includes a processor 502 (or multiple processors). A processor can include a microprocessor, a core of a multi-core microprocessor, a microcontroller, a programmable integrated circuit, a programmable gate array, or another hardware processing circuit.

The device or system 500 further includes one or more non-transitory machine-readable or computer-readable storage media 504 that store machine-readable instructions executable on the processor 502 to perform various tasks. Machine-readable instructions executable on a processor can refer to the instructions executable on a single processor or the instructions executable on multiple processors.

The machine-readable instructions stored in the storage medium 504 include vehicle control transfer management instructions 506 that can execute to perform any of various operations described herein, such as by the vehicle control transfer logic 130 or 132 (FIG. 1) or by the enrollment logic 134.

The device or system 500 further includes a communication interface 508 to perform communications over a wireless and/or a wired network. The communication interface 408 includes a transceiver (e.g., a radio transceiver, a network interface controller, etc.), and a protocol stack including protocol layers that perform communications according to respective communication protocols.

The storage medium 504 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

Various examples according to the present disclosure are set forth in the clauses below.

AA. An electronic device comprising: a communication interface; and at least one processor configured to exchange information with another device via the communication interface to allow transfer of control of operable aspects of a vehicle from a source entity to a target entity.

BB. The electronic device of clause AA, wherein the information comprises policy elements useable by the target entity to gain control of the operable aspects of the vehicle.

CC. The electronic device of claim BB, wherein the policy elements comprise a policy element specifying a restriction in an operation of the vehicle by the target entity.

DD. The electronic device of claim CC, wherein the restriction in the operation of the vehicle comprises one or more of a maximum operating condition of driving of the vehicle, a geofence that restricts movement of the vehicle geographically, a restriction in access to a portion of the vehicle, a restriction in access of data of the vehicle.

EE. The electronic device of any of clauses AA to DD, wherein the information comprises a credential selected from among a key, a certificate, and an electronic cryptographic element.

FF. The electronic device of any of clauses AA to EE, wherein the information allows the target entity to remotely control the vehicle that is a driverless vehicle.

GG. The electronic device of any of clauses AA to FF, wherein the source entity is selected from among: an owner of the vehicle, an operator of the vehicle, a government entity that provides a license or registration in association with the vehicle, a law enforcement entity, a finance entity that has provided a loan on the vehicle, an insurance entity that provides insurance coverage for the vehicle, and a manufacturer of the vehicle.

HH. The electronic device of any of clauses AA to GG, wherein the operable aspects of the vehicle comprise a first set of operable aspects of the vehicle, and wherein the at least one processor is configured to exchange information with a further device via the communication interface to allow transfer of a second set of operable aspects of the vehicle from the source entity to another entity different from the target entity, wherein the second set of operable aspects is different from the first set of operable aspects.

II. The electronic device of any of clauses AA to HH, wherein the information specifies that the target entity is allowed to transfer control of the vehicle to a further entity different from the target entity and the source entity.

JJ. The electronic device any of clauses AA to II, wherein the information specifies a time at which an ability to control the vehicle by the target entity expires.

KK. The electronic device of any of clauses AA to JJ, further comprising selecting the operable aspects of the vehicle to which control is passed from the source entity to the target entity based on a selected profile of a plurality of profiles that govern different types of control transfer of the vehicle.

LL. The electronic device of any of clauses AA to KK, wherein the at least one processor is configured to establish a secure connection with the another device using a credential of the source entity and a credential of the target entity.

MM. The electronic device of clause LL, wherein the at least one processor is configured to enroll with a central authority server to obtain the credential of the source or target entity.

NN. The electronic device of clause MM, wherein the at least one processor is configured to receive policy information from the central authority server, the policy information specifying operable aspects of the vehicle that the source entity is permitted to transfer to other entities.

OO. The electronic device of any of clauses AA to NN, wherein the at least one processor is configured to exchange further information with the another device to deauthorize control of the vehicle by the target entity.

PP. A method comprising exchanging, by an electronic device, information with another device over a communication medium to allow transfer of control of operable aspects of a vehicle from a source entity to a target entity.

QQ. The method of clause PP, further comprising exchanging policy elements with the another device for use in accessing the operable aspects of the vehicle during control of the vehicle by the target entity.

RR. The method of clause QQ, wherein the policy elements comprise a policy element specifying a restriction in an operation of the vehicle by the target entity.

SS. The method of any of clauses PP to RR, further comprising: enrolling with a central authority server to obtain a credential of the source or target entity, and using the credential to establish a secure connection with the another device.

TT. One or more machine-readable storage media storing instructions that upon execution cause an electronic device to exchange information with another device over a communication medium to allow transfer of control of operable aspects of a vehicle from a source entity to a target entity.

UU. The one or more machine-readable storage media of clause TT, wherein the instructions upon execution cause the electronic device to exchange further information with the another device to deauthorize control of the vehicle by the target entity.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An electronic device comprising:
   a communication interface; and
   at least one processor configured to:
      send an enrollment request to a server to enroll a source entity;
      receive, from the server in response to the server verifying an identity of the source entity responsive to the enrollment request, an enrollment response comprising information useable by the source entity to authenticate with a target entity to which transfer of control of a vehicle is to be performed; and
      exchange the information with another device via the communication interface to allow transfer of control of operable aspects of the vehicle from the source entity to the target entity.

2. The electronic device of claim 1, wherein the information comprises policy elements useable by the target entity to gain control of the operable aspects of the vehicle.

3. The electronic device of claim 2, wherein the policy elements comprise a policy element specifying a restriction in an operation of the vehicle by the target entity.

4. The electronic device of claim 3, wherein the restriction in the operation of the vehicle comprises one or more of a maximum operating condition of driving of the vehicle, a geofence that restricts movement of the vehicle geographically, a restriction in access to a portion of the vehicle, a restriction in access of data of the vehicle.

5. The electronic device of claim 1, wherein the information comprises a credential selected from among a key, a certificate, and an electronic cryptographic element.

6. The electronic device of claim 1, wherein the information allows the target entity to remotely control the vehicle that is a driverless vehicle.

7. The electronic device of claim 1, wherein the source entity is selected from among: an owner of the vehicle, an operator of the vehicle, a government entity that provides a license or registration in association with the vehicle, a law enforcement entity, a finance entity that has provided a loan on the vehicle, an insurance entity that provides insurance coverage for the vehicle, and a manufacturer of the vehicle.

8. The electronic device of claim 1, wherein the operable aspects of the vehicle comprise a first set of operable aspects of the vehicle, and wherein the at least one processor is configured to:
   exchange information with a further device via the communication interface to allow transfer of a second set of operable aspects of the vehicle from the source entity to another entity different from the target entity, wherein the second set of operable aspects is different from the first set of operable aspects.

9. The electronic device of claim 1, wherein the information specifies that the target entity is allowed to transfer control of the vehicle to a further entity different from the target entity and the source entity.

10. The electronic device of claim 1, wherein the information specifies a time at which an ability to control the vehicle by the target entity expires.

11. The electronic device of claim 1, further comprising selecting the operable aspects of the vehicle to which control is passed from the source entity to the target entity based on a selected profile of a plurality of profiles that govern different types of control transfer of the vehicle.

12. The electronic device of claim 1, wherein the at least one processor is configured to establish a secure connection with the another device using a credential of the source entity and a credential of the target entity.

13. The electronic device of claim 12, wherein the at least one processor is configured to exchange the information with the another device by:
   sending, by the electronic device, an authentication request to the another device, and
   receiving, by the electronic device, an authentication response from the another device, the authentication request and the authentication response allowing the electronic device and the another device to authenticate one another; and
   establish a secure connection between the electronic device and the another device responsive to the authenticating of one another.

14. The electronic device of claim 13, wherein the at least one processor is configured to receive policy information from the server, the policy information specifying operable aspects of the vehicle that the source entity is permitted to transfer to other entities.

15. The electronic device of claim 1, wherein the at least one processor is configured to:
   exchange further information with the another device to deauthorize control of the vehicle by the target entity.

16. The electronic device of claim 1, wherein the operable aspects transferred from the source entity to the target entity are selected from one or more of: remote driving of the vehicle, control of a door lock of the vehicle, and control of a window of the vehicle.

17. The electronic device of claim 1, wherein the exchange of the information with the another device sets a restriction on an operation of the vehicle after the transfer, the restriction comprising one or more of: a maximum speed of the vehicle, a maximum acceleration of the vehicle, a maximum number of engine revolutions of the vehicle, a maximum braking rate of the vehicle.

18. The electronic device of claim 1, wherein the exchange of the information with the another device sets a restriction on an operation of the vehicle after the transfer, the restriction comprising one or more of: a restriction on a part of the vehicle that is accessible, a restriction on access of a control interface that enables access of stored information, and a restriction on access of a control interface to modify a setting or configuration of the vehicle.

19. A method comprising:
   sending, by an electronic device, an enrollment request to a server to enroll a source entity;
   receiving, from the server in response to the server verifying an identity of the source entity responsive to the enrollment request, an enrollment response comprising information useable by the source entity to authenticate with a target entity to which transfer of control of a vehicle is to be performed; and exchanging, by the electronic device, the information with another device over a communication medium to allow transfer of control of operable aspects of the vehicle from the source entity to the target entity.

20. The method of claim 19, wherein the information comprises policy elements, the method further comprising:

exchanging the policy elements with the another device for use in accessing the operable aspects of the vehicle during control of the vehicle by the target entity.

21. The method of claim 19, wherein the enrollment request comprises the identity of the source entity, vehicle information identifying the vehicle, and control parameter information indicating the operable aspects to be transferred, and wherein the enrollment response is received responsive to the server verifying the identity of the source entity and a capability of the source entity to transfer the operable aspects.

22. The method of claim 19, wherein exchanging the information with the another device comprises:

sending, by the electronic device, an authentication request to the another device, and receiving, by the electronic device, an authentication response from the another device, the authentication request and the authentication response allowing the electronic device and the another device to authenticate one another, the method further comprising:

establishing, by the electronic device, a secure connection with the another device responsive to the authenticating of one another.

23. One or more machine-readable storage media storing instructions that upon execution cause an electronic device to:

send an enrollment request to a server to enroll a source entity;

receive, from the server in response to the server verifying an identity of the source entity responsive to the enrollment request, an enrollment response comprising information useable by the source entity to authenticate with a target entity to which transfer of control of a vehicle is to be performed; and exchange information with another device over a communication medium to allow transfer of control of operable aspects of the vehicle from the source entity to the target entity.

24. The one or more machine-readable storage media of claim 23, wherein the instructions upon execution cause the electronic device to:

exchange further information with the another device to deauthorize control of the vehicle by the target entity.

\* \* \* \* \*